J. N. BRATTAIN.
DRILLING MACHINE.
APPLICATION FILED SEPT. 19, 1911.

1,016,735.

Patented Feb. 6, 1912.

Witnesses

Inventor
J. N. Brattain
By
Attorneys

J. N. BRATTAIN.
DRILLING MACHINE.
APPLICATION FILED SEPT. 19, 1911.

1,016,735.

Patented Feb. 6, 1912.
5 SHEETS—SHEET 2.

Witnesses
T. Jenkins
Francis Boyle

Inventor
J. N. Brattain
By Chandlee & Chandlee
Attorneys

J. N. BRATTAIN.
DRILLING MACHINE.
APPLICATION FILED SEPT. 19, 1911.

1,016,735.

Patented Feb. 6, 1912.
5 SHEETS—SHEET 3.

Witnesses
Francis Boyle

Inventor
J. N. Brattain,
By 
Attorney

J. N. BRATTAIN.
DRILLING MACHINE.
APPLICATION FILED SEPT. 19, 1911.

1,016,735.

Patented Feb. 6, 1912.
8 SHEETS—SHEET 4.

Inventor
J. N. Brattain

Witnesses
Francis Boyle

By 
Attorneys

J. N. BRATTAIN.
DRILLING MACHINE.
APPLICATION FILED SEPT. 19, 1911.

1,016,735.

Patented Feb. 6, 1912.

Witnesses

Inventor
J. N. Brattain

By
Attorneys

UNITED STATES PATENT OFFICE.

JOHN NORTH BRATTAIN, OF DAVIDSON, NORTH CAROLINA.

DRILLING-MACHINE.

1,016,735.

Specification of Letters Patent.

Patented Feb. 6, 1912.

Application filed September 19, 1911. Serial No. 650,211.

*To all whom it may concern:*

Be it known that I, JOHN N. BRATTAIN, a citizen of the United States, residing at Davidson, in the county of Mecklenburg, State of North Carolina, have invented certain new and useful Improvements in Drilling-Machines; and I do hereby declare the following to be a full, clear, and exact description of the invention, such as will enable others skilled in the art to which it appertains to make and use the same.

This invention relates to drilling machines and has for a primary object to generally improve and simplify this class of devices.

A second object of the invention is to provide a novel lifting and releasing mechanism for the drill actuating cable.

A third object of the invention is to provide a controlling means for the lifting and releasing device whereby the length of stroke of the drill may be varied.

A fourth object of the invention is to provide novel clutch mechanism which permits of the cable winding drum being selectively actuated to lengthen or shorten the cable while the lifting and releasing means is in operation.

A fifth object of the invention is to provide a novel head adapted to be slidably fitted to the derrick and equipped with means for simultaneously rotating a drill and supplying water thereto, this head being used independently of the lifting and releasing means but being supported by the cable controlled by said lifting and releasing means.

A sixth object of the invention is to provide a driving shaft equipped with two clutches, one of which disconnects the lifting and releasing means from the driving shaft when in inactive position, and the other of which permits of the cable carried by said means being actuated by hand so as to slowly and gradually sink the rotating drill when the head is in use.

A seventh object of the invention is to provide a novel cable terminating in two branches which are supported by novelly arranged pulleys at the top of the derrick and which are terminally adapted to receive selectively, a churn drill attaching yoke, a pile or casing driver, or the rotary drill head.

An eighth object of the invention is to provide a novel derrick adapted to simultaneously, slidably and hingedly secure the rotary drill head, the latter being adapted to be swung to one side of the derrick so as to be out of the way when either the churn drill, pile, or casing driver is in use.

With the above and other objects in view the invention consists of certain novel details of construction and combination of parts hereinafter fully described and claimed, it being understood that various modifications may be made in the minor details of construction within the scope of the appended claims.

In the accompanying drawings forming part of this specification.

Referring now to the drawings in which like characters of reference designate similar parts, 10 designates longitudinal ground sills the opposite ends of which are connected by transverse sills 11. Rising from the ground sills are spaced uprights 12 which are connected at their lower ends to the ground sills and are anchored in upright position through the instrumentality of inclined braces 13 which are terminally connected to the ground sills and to the upper ends of the uprights. The uprights are furthermore tied together through the instrumentality of spaced tie beams 14. A ladder 15 is pivotally connected intermediate its ends to the upper ends of the uprights through the instrumentality of pivot bolts 16. The parts described form a derrick the ladder supporting the tool attaching devices and actuating cable, and spaced horizontally disposed bed sills 17 being connected terminally to the braces 13 and to the uprights 12 to support the cable actuating mechanism.

A plurality of inclined beams 18 are terminally connected to the transverse sill 11 and lower tie beam 14. These beams are three in number, and revolubly mounted on a common spindle 19 passed through the lower ends of these beams are cable pulleys 20 and 21. A cable pulley 22 is mounted to turn on its spindle disposed above the spindle 19, and furthermore a cable pulley 23 is mounted to turn on a stand spindle secured to the transverse sill 11 intermediate the pulleys 20 and 21. A cable 24 is rigidly secured at one end to a winding drum which will be presently described and is thence trained under the pulley 21, around the pulley 23, under the pulley 20, and is then directed toward the winding drum and trained under then over a rope pulley carried by the rock arm of a lifting and releasing mechanism which also will be presently described, being thence directed back upon itself in the direction of and trained under the pulley 22 finally being directed upwardly upon the ladder and terminally attached to the tool attaching means. By virtue of the cable being rigidly secured to the drum and to the attaching means, and being looped over the pulley on the rock arm, as the rock arm vibrates the loop in the cable will be alternately lengthened and shortened so that the tool will be reciprocated as usual in devices of this character.

The lifting and releasing mechanism consists of a shaft 25 which is mounted to turn in suitable bearings 26 secured to the bed sills and is equipped with a driving gear 27. A disk 28 is keyed to the shaft and is provided at diametrically opposite points in its periphery with notches 29 and 30. A second disk 31 is mounted to turn loosely on the shaft and this disk is cut away peripherally as shown at 32 for a distance equal to about one-half its circumference, the unmutilated portion of the disk being of the same diameter as the disk 28, and the mutilated portion being of such diameter that the periphery of the disk will register with the bottom of the notches in the disk 28. The mutilated periphery or edge of the disk 31 merges into the unmutilated edge in gently outwardly curved cam surfaces 33.

The notched disk will be hereinafter referred to as a ratchet disk, and the disk having the cam surfaces, as a cam disk. Both disks are formed on their outer faces with hubs 34, and mounted to turn on these hubs are arms 35 which are connected together by spaced pins 36 the outermost pin further forming the spindle of a sheave 37 over which the bight or loop in the cable is trained as above described. A trigger or pawl 38 is loosely mounted intermediate its ends on the innermost of the pins 36, the working end of the pawl being designed to engage in the notches of the ratchet disk, and the heel of the pawl being thickened to form a counterbalancing weight which will coöperate with the pull of the tool on the cable in causing the rock arm, as the parts 35 will be hereinafter referred to, to gravitate.

The operation may be briefly described as follows: The shaft 25 is constantly rotated by the driving gear 27 in the direction of the arrow head thereby constantly rotating the ratchet disk in the same direction. The cam disk is held stationary on the shaft through the instrumentality of a lever 39 which is adjustably secured to a horizontally disposed bar 40 connected to the uprights 12 and to the inclined braces 13, a pintle 41 being engaged across the edge of the lever and passed through one of a series of openings 42 in the bar. The pull of the cable serves to hold the parts in adjusted position. The purpose of this adjustment of the lever will be hereinafter described. Now as the ratchet disk rotates, the pawl will fall into one of the notches and the rock arm will be rotated upon the shaft, the working end of the pawl riding freely upon the mutilated edge of the cam disk until it reaches the uppermost cam surface 33 whereupon the pawl will be directed out of the notch in the ratchet disk and through the instrumentality of the pull of the tool on the cable and the weighted end of the pawl, the rock arm will be rocked downwardly the working end of the pawl during this movement of the parts riding upon the periphery of the ratchet disk and dropping into the next notch of the pair of notches when the above operation will again be repeated. It will thus be seen that during the upward rocking movement of the rock arm, the loop in the cable will be lengthened and the tool lifted, while during downward rocking movement of the arm, the loop will be shortened and the tool allowed to gravitate. By virtue of the adjustable connection between the lever 39 and the bar 40, the cam disk 31 may be held stationary in such a position upon the shaft that the upper cam surface will force the pawl out of the notch in the ratchet disk at any predetermined time so that the length of the loop in the cable may be controlled and thus the stroke of the tool varied as desired.

As above stated one end of the cable is secured to a winding drum 43, the same being equipped with a shaft 44 which is mounted to turn in bearings 45 secured to the bed sills 17. A shaft 46 is mounted to turn in suitable bearings 47 arranged on the inclined braces 13, and is equipped with a gear 48 which meshes with a gear 49 fixed to the winding drum. The shaft 46 is provided with a crank handle 50 through the instrumentality of which the shaft may be rotated manually and the winding drum actuated manually under certain conditions which will presently be described. For mechanically actuating the drum, the following mechanism is employed: A substantially L-shaped bracket 51 is secured at its upper end to a cross bar 52 carried by the inclined braces. A shaft 53 is pivotally attached to the free leg 54 of the bracket and is equipped with a driving pinion 55 at one end, and is further equipped adjacent to its opposite end with a worm gear 56 designed to mesh with a worm gear 57 fixed to the winding drum. When it is desired to manually operate the drum, the pivoted shaft 53 is rocked upwardly so that the worm gear 56 disengages from the worm gear 57, a hand lever 58 being hinged at one end to one of the inclined braces and being equipped with a suitable bearing 59 in which the end of the shaft 53 is journaled, to attain this end. For pivotally mounting the shaft, a bearing block 60 is mounted to rock on the bracket arm 54 through the instrumentality of stud bolts 61, these stud bolts being provided with oppositely disposed flat faces 62 which permit of the bearing block rocking slightly on the bolts.

In order to rotate the drum in opposite directions, I provide a shaft 63 which extends at a right angle to the shaft 53, and is journaled at one end in a bearing 64 carried upon one of the bed sills, the opposite end portion of the shaft being surrounded by a sleeve 65 which is journaled in a bearing 66 secured to the other bed sill, the sleeve being equipped with a driving pulley 67 which may be connected through the instrumentality of a belt to a motor of any preferred form. It is clear that the sleeve is thus rotated constantly upon the shaft. Loosely mounted on the sleeve are a pair of bevel gears 68 which are disposed in mesh with the bevel pinion 55 of the drum actuating shaft 53. Each of the bevel gears 68 is provided on its inner face with a clutch surface 69, and mounted to slide on the sleeve is a clutch gear 70 having clutch surfaces 71 adapted to mesh with the clutch surfaces of the bevel gears 68.

For shifting the clutch gear 70 into mesh with either of the gears 68 whereby the drum actuating shaft 53 may be rotated in either direction, a stand shaft 72 is journaled at its opposite ends in bracket arms 73 and 74 secured to the bed and ground sills respectively, and projecting laterally from this shaft are parallel fingers 75 which terminate in lugs 76 that ride in a groove 77 formed circumferentially on the clutch sleeve. For rotating the stand shaft in order to slide the clutch gear, a crank arm 78 is secured at one end to the stand shaft and is loosely connected at its opposite end to a draw rod 79 which extends along the bed sill and is connected to an operating lever 80, which is pivotally mounted upon the bed sill.

In drilling soft rock the above described lifting and releasing mechanism is operated continuously, and to attain this end the shaft 63 is equipped with a pinion 81 which meshes with the above mentioned driving gear 27, the shaft 63 being operatively connected to the sleeve 65 through the instrumentality of a friction clutch shown conventionally at 82. The shaft 63 is furthermore operatively connected to a pump shown conventionally at 83 through the instrumentality of a crank 84 and pitman 85. It will thus be seen that during the actuation of the lifting and releasing mechanism the pump is simultaneously actuated for directing a stream of water through the drilling tool.

Any suitable mechanism may be employed for shifting the clutch 82 into active or inactive position, the preferred means being a revoluble shaft 86 which is journaled in an opening formed in the L-shaped bracket 51 and is equipped with crank arms 87 which engage the gudgeons of a ring 88 which is mounted in a groove on the clutch sleeve. The shaft is equipped at its free end with an operating lever 89.

As above stated the cable 24 is led upwardly upon the ladder and is terminally branched, the branches 90 terminating in loops 91 adapted to secure a tool attaching means. For driving casings and piles, a weight 92 is provided on its sides with hooks 93 which engage in the loops of the cable branches. For securing a churn drill, a yoke 94 is provided centrally with a clamp as shown conventionally at 95 and terminates at its opposite ends in hooks 96 adapted to engage in the loops of the branches. The loops are furthermore adapted to engage a novel head which is utilized in securing a revoluble drill for sinking a hole in hard rock.

The head is designated in general by the numeral 97 and consists of a substantially rectangular frame comprising upper and lower bars 98 and 99 which are connected at their opposite ends by side bars 100 and 101. This frame is simultaneously slidably fitted and hingedly mounted on the ladder in the following manner: Guide grooves 102 are formed in the inner faces of the ladder sides, and attached to the front edges of the sides are metal guide strips 103 the side portions of which extend beyond the bottom or inner walls of the grooves and also beyond the outer faces of the ladder sides. Substantially U-shaped attaching members 104, are disposed to straddle the guide plates and have their terminals hooked over the exposed outer and inner longitudinal edge portions of the guide plates. These attaching members loosely embrace the guide plates and each member is rigidly secured to one leg 105 of a hinge designated in general by the numeral 106 the mating leg 107 of the hinge being rigidly secured to one of the side bars of the frame, a common pintle 108 passing through the lugs of both hinges on the same side of the frame for attaching the frame to the attaching members 104. By virtue of this construction the frame is mounted to slide longitudinally upon the ladder, and furthermore in order to rock the frame to one side of the ladder when not in use, one of the pintles may be removed, the attaching members corresponding to this pintle being thus released from the frame and immediately gravitated to the bottom of the ladder whereupon the frame may be rocked out from the ladder on the active hinges.

The frame upper bar is equipped with hooks 109 to receive the loops of the cable, it being understood that when this frame is in use in drilling hard rock that a certain length of the cable is first run off from the drum in order to permit of the frame gradually gravitating upon the ladder during rotation of the drill, it being understood that the lifting and releasing mechanism is dispensed with during this operation of the device, the manner of doing this being to rock the pawl 38 on its pivot until the weighted end bears upon the notched edge of the ratchet disk whereupon the rocking arm will remain stationary in its lowest limit of movement and simply support without actuating the cable, the latter being played off from the drum as needed either by hand or through the instrumentality of the clutch lever 80 as above described.

Disposed within the frame in parallelism with the upper and lower bars is an intermediate bar 110, which is secured at one end to one of the side bars 101 and is secured at its opposite end to a bar 111 which is disposed in parallelism with the side bar and is terminally attached to the upper and lower bars. A drill receiving bearing box 112 is mounted on the lower bar, and mounted on the upper and intermediate bars are alined bearing boxes 113 and 114 within which are journaled the ends of a sleeve 115, this sleeve being designed to receive a rotary hard rock drill 116, connection between the parts being made by a set screw 117 passed through the sleeve and bearing upon the drill. The drill is hollow, and for directing a stream of water through the drill a short pipe connection 118 is arranged above the upper bar and communicates with the drill through the instrumentality of a stuffing box 119. The pipe connection is connected to the outlet pipe 120 of the pump through the instrumentality of a rubber or similar hose 121.

Figures 1, 12, 13:
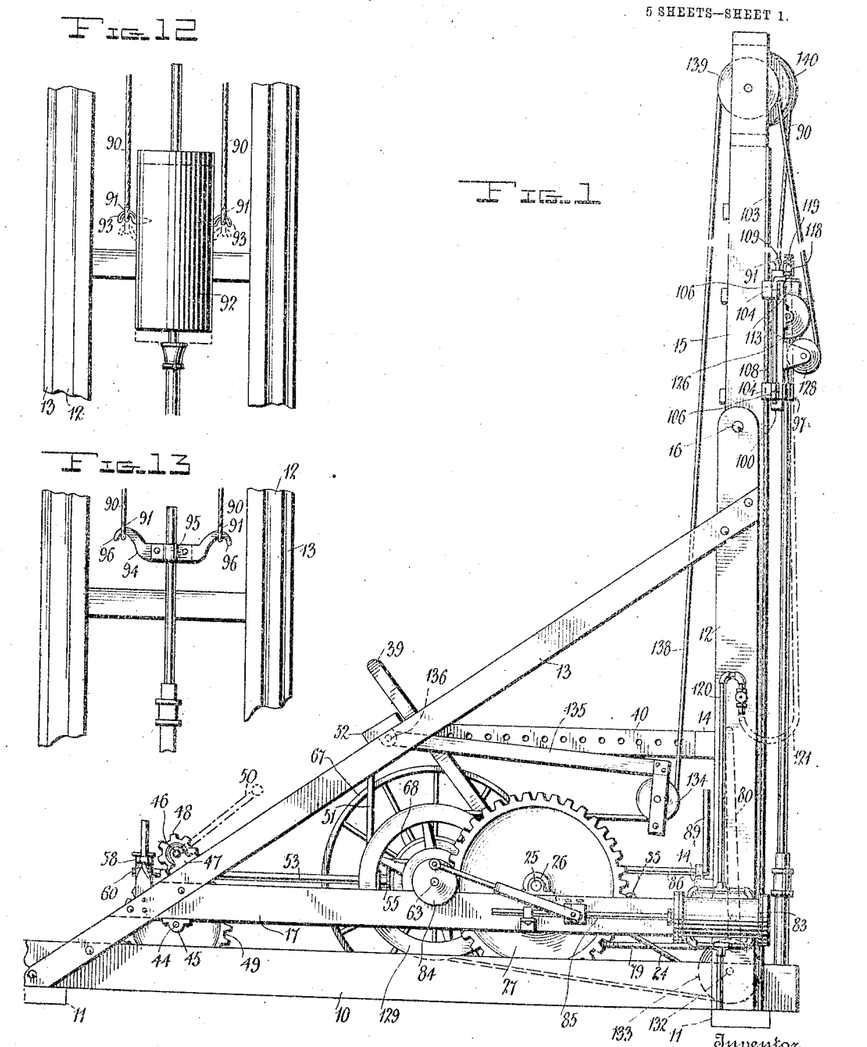
—Figure 1 is a side elevation of the device.
Fig. 12 is a fragmentary view in elevation showing the cable supporting a pile or casing driving weight.
Fig. 13 is a fragmentary view in elevation showing the cable supporting a churn drill attaching yoke.
Figure 2:
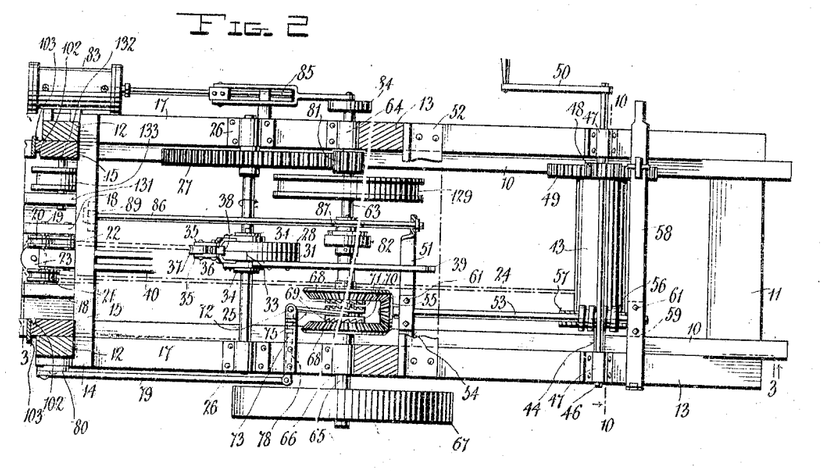
Fig. 2 is a plan view with parts broken away.
Figures 3, 8, 9:
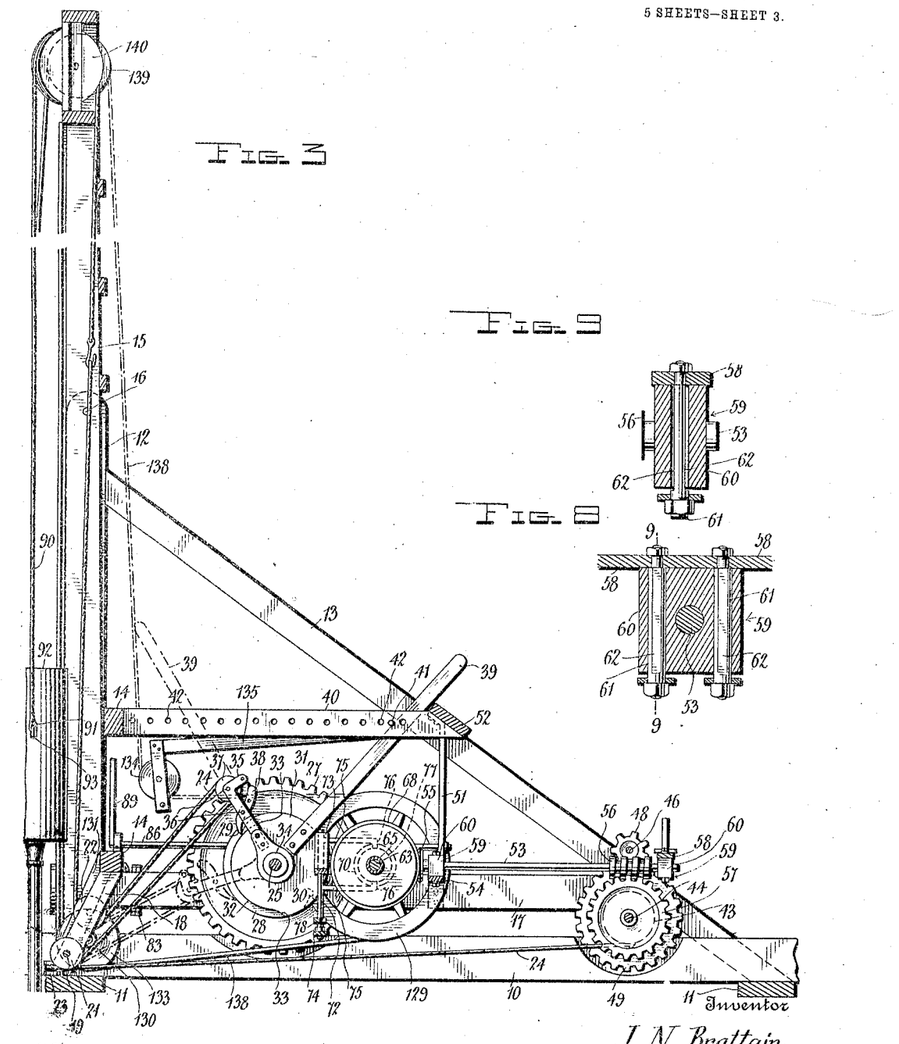
Fig. 3 is a longitudinal sectional view taken on the line 3—3 Fig. 2.
Fig. 8 is a longitudinal sectional view through the loosely mounted winding drum driving shaft bearing.
Fig. 9 is a cross sectional view on the line 9—9 Fig. 8 with the bolt in elevation.
Figures 4, 10, 17:
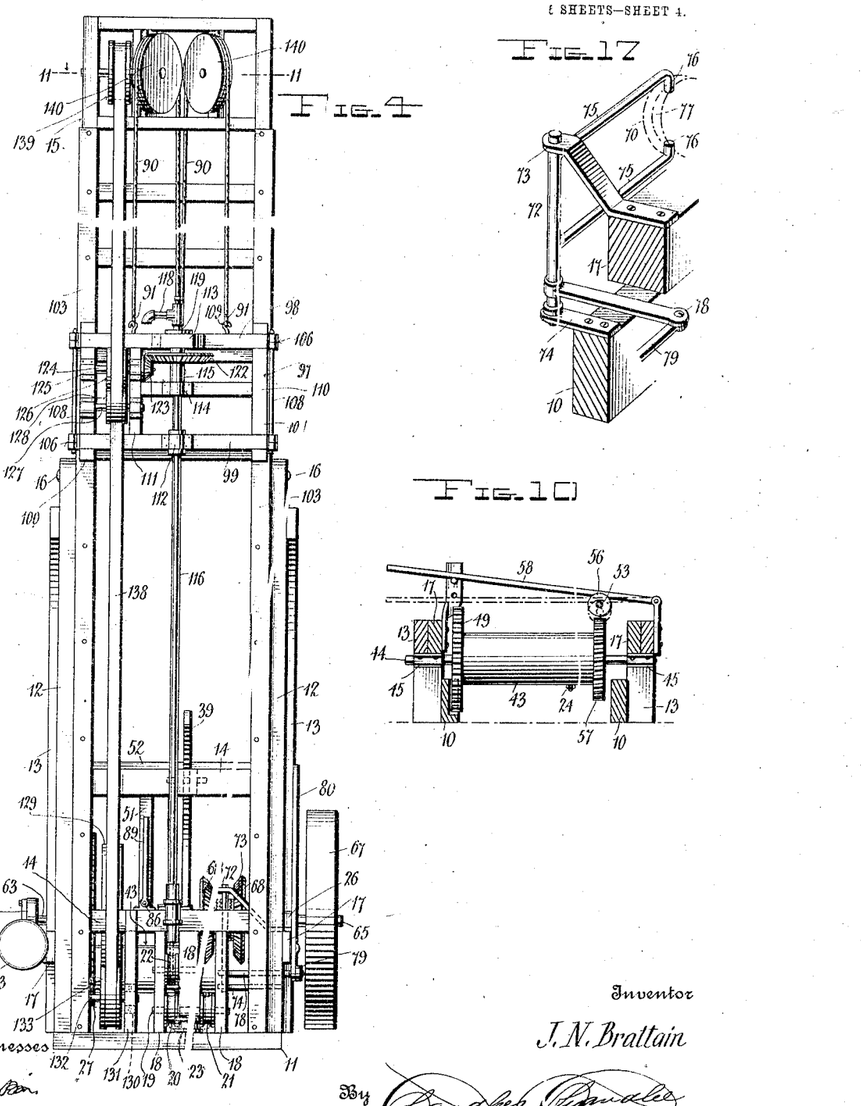
Fig. 4 is an end elevation of the device equipped with a head for rotating a drill.
Fig. 10 is a cross sectional view taken on the line 10—10 Fig. 2.
Fig. 17 is a detail perspective view of one of the clutch shifting mechanisms.
Figure 5:
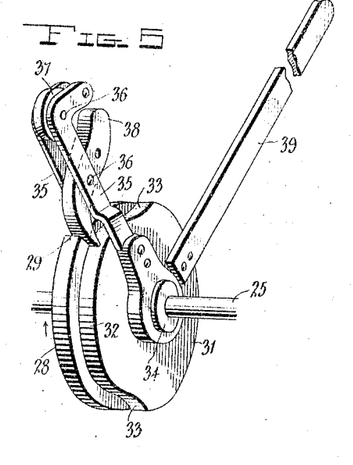
Fig. 5 is a detail perspective view of the lifting and releasing mechanism.
Figure 6:
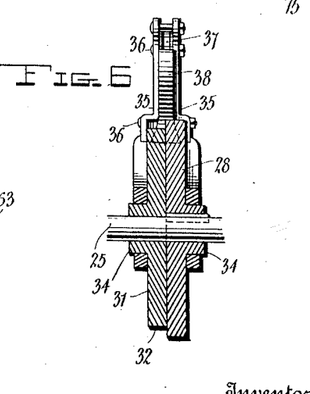
Fig. 6 is a cross sectional view through the lifting and releasing mechanism.
Figure 7:
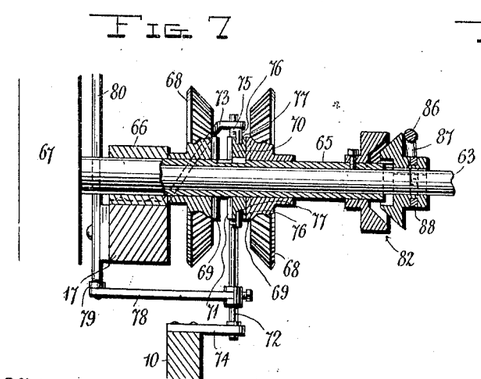
Fig. 7 is a cross sectional view through the two clutch mechanisms.

Fixed to the sleeve 115 is a bevel gear 122 which meshes with a bevel gear 123 arranged upon one end of a stub shaft 124 which is mounted in suitable bearings 125 arranged upon the bar 111 and adjacent side bar 101 of the frame. A belt pulley 126 is fixed to the stub shaft and disposed on a stub shaft 127 below this pulley is a second belt pulley 128. Fixed to the driving shaft 63 on the derrick is a belt pulley 129 and furthermore mounted in suitable bearings 130 arranged on an upstanding beam 131 which is terminally connected to the ground sill 11 and tie bar 14, is a stub shaft 132 upon which is mounted a belt pulley 133. An idler 134 is mounted on a rock arm 135 one end of which is pivoted as shown at 136 to a cross beam 52 attached to the inclined braces 13. The bight at one end of the continuous belt 138 is trained over the belt pulley 129 on the driving shaft, one side of the belt being thence trained under the idler 134, thence directed upwardly upon the ladder and trained over a belt pulley 139 disposed at the upper end of the ladder thence the opposite side of the belt is directed downwardly upon the ladder and trained under the belt pulley 128, thence over the belt pulley 126, and thence is continued downwardly upon the ladder and trained under the belt pulley 133. During rotation of the drill through the instrumentality of the belt, it is evident that the belt will at all times be held taut through the instrumentality of the rocking idler 134. This construction is most clearly shown in Fig. 1.

Figure 11:
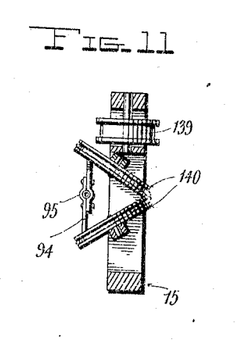
Fig. 11 is a cross sectional view taken on the line 11—11 Fig. 4 and showing a churn drill attaching yoke assembled therewith.
Figures 14, 15, 16:
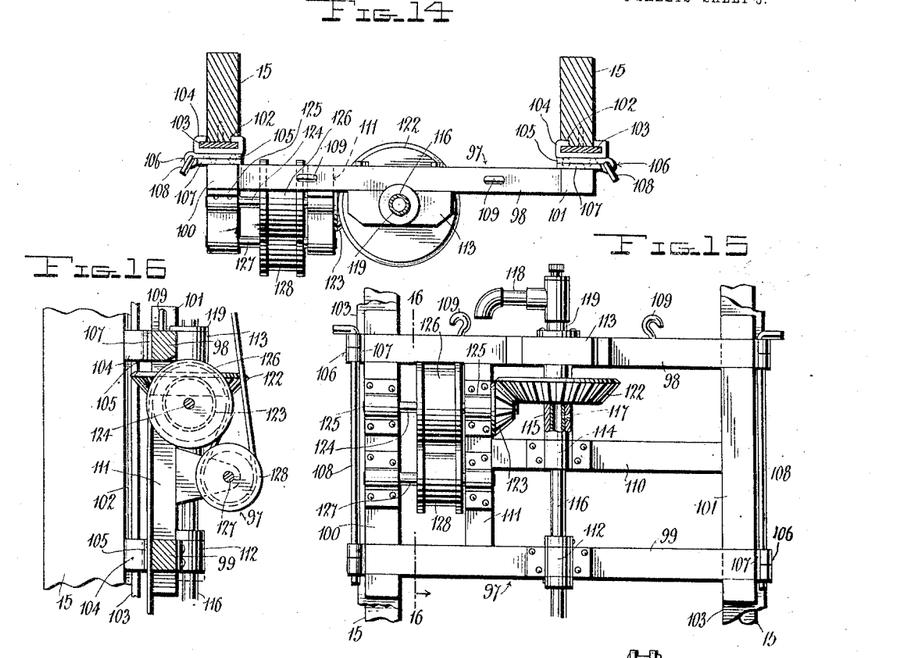
Fig. 14 is a plan view of the head applied to the derrick, the latter being shown in cross section.
Fig. 15 is a front elevation of the head applied.
Fig. 16 is a cross sectional view taken on the line 16—16 Fig. 15.

The branches of the cable are trained over outwardly inclined cable pulleys 140, shown most clearly in Fig. 11.

In drilling soft rock, driving casing, and driving piles, the above described head is rocked to one side of the ladder and the necessary tool attached to the cable whereupon the lifting and releasing mechanism is set in operation, and either the clutch lever 80 or the crank handle 50 is actuated to play out the cable from the drum. In drilling hard rock, and dirt, the head is rocked to operative position upon the ladder and the lifting and releasing mechanism is thrown into inactive position, the cable now being preferably played out from the drum in short lengths by the handle lever so that the operator may have the movement of the drill under such control as to stop the operation upon the slightest tendency of the drill to jam.

It will now be seen that from a single clutch controlled driving shaft either the lifting and releasing mechanism may be operated or the belt connection operated to actuate the tool. Furthermore it will be seen that a portion of the lifting and releasing mechanism will be in use in both instances, namely the rock arm of the mechanism, the same being used as a vibrator to reciprocate a tool for drilling in soft rock, driving casing, and driving piles, and being used as a stationary support or sheave for the cable when the latter is in use in drilling hard rock or dirt.

What is claimed, is:—

1. The combination with a tool lifting and releasing cable having a loop, of a drive shaft, a fixed ratchet disk thereon having a peripheral notch, a cam disk having loosely mounted on said shaft, means for holding said cam disk stationary, the edge of said cam disk being cut away and terminating in an outwardly extending cam surface, a rock arm having said shaft as an axis of rotation, a pawl on said rock arm adapted to engage in said notch, said pawl being adapted to be directed by said cam surface out of said notch, and means on said rock arm adapted to loosely engage the bight of said loop.

2. The combination with a tool lifting and releasing cable having a loop, of a drive shaft, a fixed ratchet disk thereon having a peripheral notch, a cam disk loosely mounted on said shaft, means for holding said cam disk stationary, the edge of said cam disk being cut away to about the depth of said notch, the unmutilated portion of the edge being substantially flush with the edge of said ratchet disk, said cut away portion merging into said unmutilated portion in a cam surface, a rock arm having said shaft as an axis of rotation, a pawl on said rock arm adapted to engage in said notch and to be directed out of said notch by said cam surface, and means on said rock arm adapted to loosely engage the bight of said loop.

3. The combination with a tool lifting and releasing cable having a loop, of a drive shaft, a ratchet disk fixed thereon having a notch, a cam disk loosely mounted on said shaft, means for holding said cam disk stationary, hubs disposed on the outer faces of said ratchet disk and said cam disk, a rock arm straddling both of said disks and loosely mounted on said hubs, a pivoted pawl on said rock arm adapted to engage in said notch, the edge of said cam disk being cut away to receive said pawl and terminating in an outwardly directed cam surface adapted to move said pawl out of said notch, and means on said rock arm adapted to loosely engage the bight of said loop.

4. The combination with a tool lifting and releasing cable having a loop, of a drive shaft, a fixed ratchet disk thereon having a notch, a cam disk loosely mounted on said shaft, an adjusting lever carried by said cam disk adapted to hold said cam disk stationary in any adjusted position on said shaft, the edge of said cam disk being cut away and terminating in an outwardly extending cam surface, a rock arm having said shaft as an axis of rotation, a pawl on said rock arm adapted to engage in said notch and to be directed out of said notch by said cam surface, and means on said rock arm adapted to loosely engage the bight of said loop.

5. The combination of a derrick, a drive shaft thereon, a drum on said derrick having an operative clutch controlled connection with said drive shaft, a tool lifting and releasing cable on said derrick and secured to said drum, and further having an open loop, a ratchet disk fixed on said shaft having a notch, a cam disk loosely mounted on said shaft, means for adjustably holding said cam disk stationary, the edge of said cam disk being cut away to about the depth of said notch, the unmutilated portion of the edge being substantially flush with the edge of said ratchet disk, said cut away portion merging into said unmutilated portion in a cam surface, a rock arm having said shaft as an axis of rotation, a pawl on said rock arm adapted to engage in said notch and to be directed out of said notch by said cam surface, and means on said rock arm adapted to loosely engage the bight of said loop.

6. The combination of a derrick, a drive shaft thereon, a power driven shaft operatively connected to said drive shaft, a winding drum on said derrick, a manually actuated shaft having an operative connection with said drum, a stub shaft pivotally connected at one end of said derrick and having a worm gear connection at the opposite end with said drum, means on the free end of said stub shaft for disengaging said worm gear connection, a clutch mechanism on said power driven shaft adapted to rotate said stub shaft in either direction, a cable attached to said drum and serving to raise and lower a tool on said derrick, and further having an open loop, a fixed ratchet disk on said drive shaft having a notch, a cam disk adapted to be held stationary on said shaft, and having a cam surface, a rock arm having said drive shaft as an axis of rotation, a pawl on said rock arm adapted to engage in said notch and to be disengaged from said notch by said cam surface, and means on said rock arm adapted to loosely engage the bight in the cable loop.

7. The combination of a derrick, a drive shaft thereon, a power driven sleeve on said derrick, a shaft housed within said sleeve having an operative connection with said drive shaft, a clutch adapted to connect said sleeve and the shaft housed therein together, a pump operatively connected to the housed shaft, a winding drum having an operative clutch connection with said sleeve, a cable on said derrick and secured to said drum, and further having an open loop, a fixed ratchet disk on said drive shaft having a notch, a cam disk adapted to be held stationary on said drive shaft, and having a cam surface, a rock arm having said drive shaft as an axis of rotation, a pawl on said rock arm adapted to engage in said notch and to be disengaged from said notch by said cam surface, and means on said rock arm adapted to loosely engage the bight in the cable loop.

8. The combination of a derrick, a drum thereon, a tool lifting and releasing cable on said derrick and secured to said drum, and having an open loop, a drive shaft, a fixed ratchet disk thereon having a notch, a cam disk loosely mounted on said shaft, an adjusting lever carried by said cam disk adapted to hold the disk stationary in any adjusted position on said shaft, the edge of said cam disk being cut away and terminating in an outwardly extending cam surface, a rock arm having said shaft as an axis of rotation, a pawl pivoted intermediate its ends on said rock arm and having its working end adapted to engage in said notch and to be disengaged from said notch by said cam surface, said pawl having a weighted end remote from said working end, and means on said rock arm adapted to loosely engage the bight of said loop.

9. The combination with a tool lifting and releasing cable having an open loop, of a drive shaft, a ratchet element on said shaft, a cam element on said shaft having an outwardly directed cam surface, a rock lever, a pawl on said rock lever adapted to engage said ratchet element and to be disengaged therefrom by said cam element, and means on said lever adapted to loosely engage the bight of said loop.

In testimony whereof, I affix my signature, in presence of two witnesses.

JOHN NORTH BRATTAIN.

Witnesses:
A. M. GRIGSBY,
H. M. POPHAM.